(No Model.)
H. E. STAHL.
CRANK SHAFT AND CRANK SHAFT BEARING FOR BICYCLES.
No. 563,211. Patented June 30, 1896.
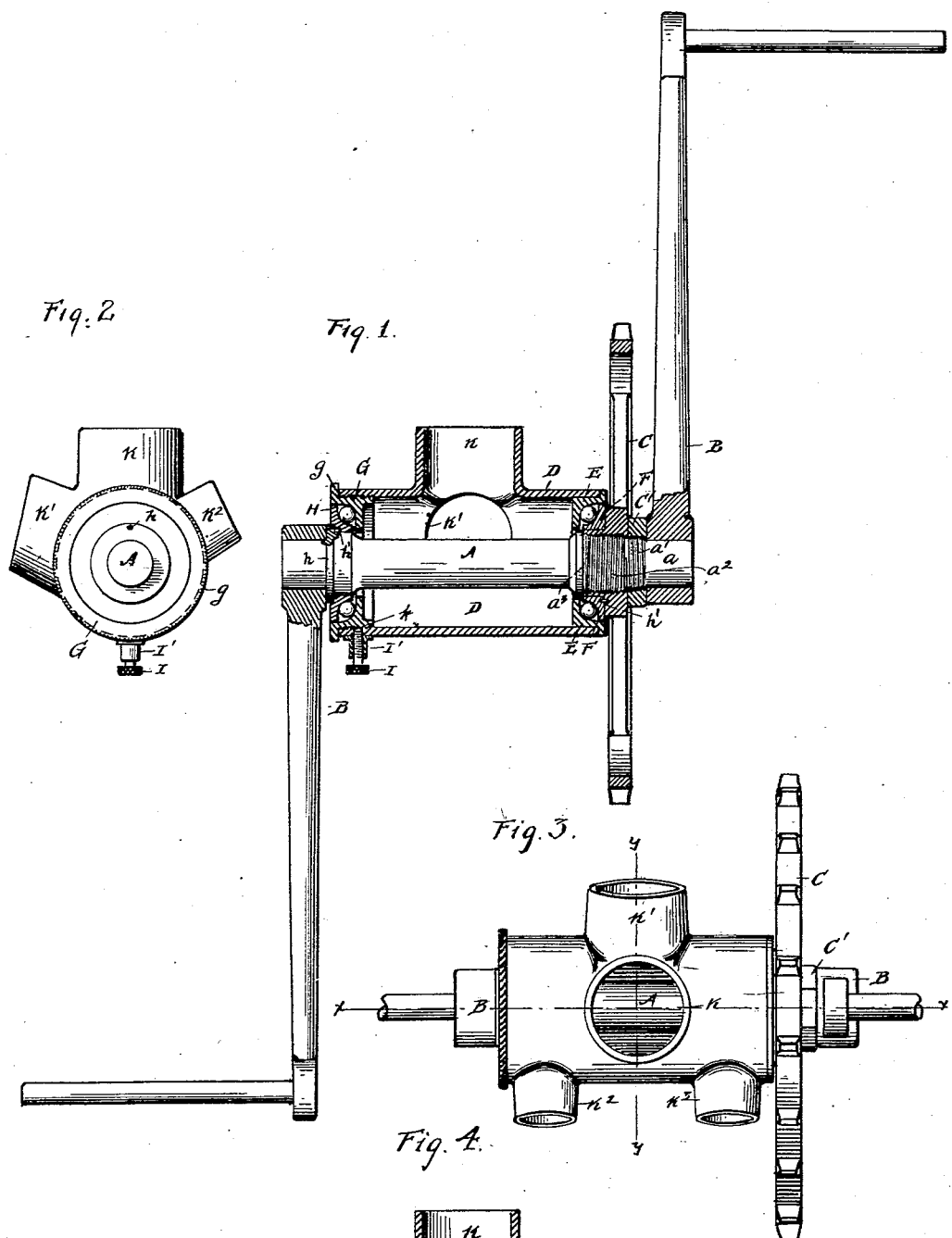
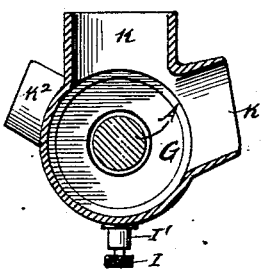
WITNESSES
Geo. M. Anderson
Philip Amasi
INVENTOR
H. E. Stahl
by E. W. Anderson
his Attorney

UNITED STATES PATENT OFFICE.

HARRY E. STAHL, OF TRENTON, NEW JERSEY, ASSIGNOR TO TOMLINSON & STAHL, OF SAME PLACE.

CRANK-SHAFT AND CRANK-SHAFT BEARING FOR BICYCLES.

SPECIFICATION forming part of Letters Patent No. 563,211, dated June 30, 1896.

Application filed October 29, 1895. Serial No. 567,334. (No model.)

*To all whom it may concern:*

Be it known that I, HARRY E. STAHL, a citizen of the United States, and a resident of Trenton, in the county of Mercer and State of New Jersey, have invented certain new and useful Improvements in Crank-Shafts and Crank-Shaft Bearings for Bicycles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a central longitudinal section of the invention, a portion of the crank-shaft and its collar $h$ being also in section to show one of the dowel-pins $h'$. Fig. 2 is an end view with the crank removed. Fig. 3 is a top plan view, and Fig. 4 is a section on the line $y\ y$, Fig. 3.

This invention has relation to certain new and useful improvements in crank-shafts and crank-shaft bearings for bicycles, and it is designed to provide mechanism of this character wherein the spread or tread of the cranks shall be as short as possible, while at the same time the shaft-bracket is of sufficient length to provide an extended bearing for the shaft and to permit the use of frame-tubes of comparatively large diameter.

The present invention is, as above indicated, designed to afford a maximum length of bearing with the shortest possible tread.

The invention is also designed to provide mechanism of this character, all the parts of which are of strong and simple character, capable of being manufactured for the most part without special tools, and so constructed and combined as to facilitate repairs or the replacing or renewal of any part.

It is also designed to provide improved means of adjustment for taking up the wear of the bearings without the use of tools; also to provide means whereby the sprocket-wheel can be readily removed and exchanged for one of a different gear or replaced by a new one; also to provide mechanism of this character which is constructed to exclude dust in so far as possible, and is of neat and finished exterior appearance, and which is light.

With these objects in view the invention consists in the novel construction and combination of parts, all as hereinafter described, and pointed out in the appended claims.

Referring to the accompanying drawings, the letter A designates the crank-shaft; B, the cranks; C, the sprocket-wheel, and D the shaft-bracket.

The sprocket-wheel end of the shaft A is formed with a plain cylindrical portion $a$, upon which the crank is fitted and keyed, and with a right-hand-threaded portion $a'$, and a left-hand-threaded portion $a^2$ of larger diameter, at the inner end of which is a shoulder $a^3$. The hub and boss of the sprocket-wheel has a thread corresponding to that of the portion $a^2$. The wheel is placed on the shaft, passing over the threaded portion $a'$, and is screwed up against the shoulder $a^3$. A jam-nut C' is then screwed up against the outer face of the wheel, and the crank fits closely against this nut. It will be noted that the left-hand threading of the portion $a^2$ will cause the wheel to tighten upon the shaft when power is applied to the cranks, and that the nut C' will prevent its becoming loosened in back pedaling. To remove the wheel, the crank is taken off and the nut C' run off. The wheel can then be readily unscrewed.

In some bearings of this class the sprocket-wheel has been placed upon the shaft with its boss outward, and in some machines a nut and washer are employed outside of the boss and between it and the crank. All this requires a greater length of the crank-shaft and an increased spread of the cranks. To avoid this, I place the wheel upon the shaft with its boss inward, and upon this boss I seat and secure the stationary cone-bearing F, which fits into a cup E, rigidly secured within that end of the tubular bracket D, and within which is the ball-race. Said cone-bearing F is turned to fit neatly and in a substantially dust-proof manner within the cup, thereby avoiding the necessity for a dust-cap. In the opposite end portion of the bracket is an adjustable cup G, which is similar to the cup E, except that it has a threaded engagement with the walls of the bracket and is provided at its outer end with a milled flange $g$. The shell of this cup is made of considerable length in order to give it an extended bearing, being extended inwardly beyond the bottom of the cup proper.

H is a stationary cone which is secured on the crank-shaft, and fits neatly within the said cup. All tendency of this cone to move outwardly is resisted by a shoulder $h$ of the crank-shaft against which it seats. The cone is counterbored and seats said shoulder flush or nearly flush with its outer surface, whereby the crank is allowed to set up in close relation to the cone, and the shaft shortened to this extent.

It will be observed that the entire adjustment of both sets of bearings is effected by means of the cup G, which, by means of its milled flange $g$, can be readily adjusted without the use of a tool. A set screw or gib I, having a bearing in a boss I' of the bracket, affords means for securing the cup in the desired adjustment. The end of this gib or screw is usually provided with a block $k$, of brass, lead, or other soft material, which prevents injury to the thread of the cup.

In order that the cones F and H may be capable of being readily removed and replaced, I usually secure them upon the shaft by means of dowel-pins $h'$, as indicated.

It will appear from the foregoing, and by reference to the drawings, that there is very little end projection of the crank-shaft beyond the ends of the bracket, the cones and bearings being entirely inside of said bracket. This feature not only shortens the tread, but it also adds very much to the neatness of appearance, as will be apparent. While the tread need not exceed four and one-half inches, I am enabled to employ a bracket of about three and one-half inches length or slightly longer. This gives a proper spread of the bearings and also enables me to provide the bracket with sockets of sufficient size to receive frame-tubes of large diameter, and to give the proper spread to the braces running to the rear wheel.

Inasmuch as the cones are turned to fit neatly within the cups, the necessity for the use of separate dust-cups is obviated.

Having thus described my invention, what I claim as new, and desire to secure by Letters Patent, is—

1. The combination of the crank-shaft, the sprocket-wheel secured on one end of the said shaft, said wheel having its axial boss extending inward, and its outer face plain, the stationary cone removably secured to the said boss, the similar stationary cone removably secured on the opposite end portion of the said shaft, the tubular bracket and the outwardly-facing cups secured in the end portions of the said bracket, and having ball-races therein, the cup at the sprocket-wheel end being fixed, and that at the opposite end having a threaded connection with the said bracket, and provided at its outer end with an external adjusting-flange, substantially as specified.

2. The combination with the crank-shaft, having the right and left threaded portions of different diameters, the sprocket-wheel screwed upon the left-hand threaded portion and having an inwardly-extended boss, the jam-nut screwed upon the right-hand threaded portion, the cone F secured upon the said boss, and the similar cone H secured upon the opposite end portion of said shaft and counterbored upon its outer face to seat a shoulder thereof, of the tubular bracket, the cup fixed within one end portion of said bracket and having a ball-race, said cup being fitted to receive the cone F, the cup adjustably seated within the opposite end portion of the bracket and fitted to receive the cone H, said cup also having a ball-race and a milled flange, and the gib or screw for securing the adjustment of the said cup, substantially as specified.

In testimony whereof I affix my signature in presence of two witnesses.

HARRY E. STAHL.

Witnesses:
GEORGE H. PARMELEE,
GEO. M. ANDERSON.